United States Patent [19]
Rice et al.

[11] Patent Number: 5,105,391
[45] Date of Patent: Apr. 14, 1992

[54] METHOD FOR HIGH-RESOLUTION SEISMIC RECORDING USING DETECTORS PLANTED AT SHALLOW DEPTHS

[75] Inventors: James A. Rice; Christine E. Krohn; Louis M. Houston, all of Houston, Tex.

[73] Assignee: Exxon Production Research Company, Houston, Tex.

[21] Appl. No.: 606,251

[22] Filed: Oct. 31, 1990

[51] Int. Cl.$^5$ .............................................. G01V 1/20
[52] U.S. Cl. ......................................... 367/58; 367/49; 367/57; 181/112; 181/122; 181/401
[58] Field of Search ................ 367/36, 37, 54, 56, 367/57, 58, 59, 49; 181/112, 401, 122

[56] References Cited

U.S. PATENT DOCUMENTS

| | | | |
|---|---|---|---|
| 2,087,702 | 7/1937 | Peters | 367/37 |
| 4,298,967 | 11/1981 | Hawkins | 367/57 |
| 4,499,565 | 2/1985 | Fix et al. | 367/49 |
| 4,532,618 | 7/1985 | Wemer | 367/49 |
| 4,758,997 | 7/1988 | Nelson | 367/49 |

OTHER PUBLICATIONS

Geophysics: vol. 51, No. 2: "High-resolution common depth-point reflection profiling: Field acquisition parameter design"; Feb. 1986, R. W. Knapp et al.
Geophysics; Leading Edge of Exploration "Techniques applied to obtain very high resolution 3-D seismic imaging at an Athabasca tar sands thermal plot"; Dec. 1987; N. Pullin, L. Matthews, K. Hirsche.
Geophysical Society of Tulsa Annual Spring Symposium: "Seismic Reflection Pro-Profiling of the Near-Surface"; Spring 1988: R. W. Knapp, et al.

*Primary Examiner*—Ian J. Lobo
*Attorney, Agent, or Firm*—Darcell Walker

[57] ABSTRACT

A method for high-resolution seismic recording with increased bandwidth using detectors planted at shallow depths below the earth's surface. In one embodiment, an optimum depth where the amplitudes of high frequency signals increase relative to that of the noise during high-resolution recording is determined, geophones are then planted at that optimum depth and signals are recorded at that depth. To find this optimum depth, detectors are planted at various depths below the earth's surface in order to record the signals at those various depths. The frequency spectra for each detected signal is generated and a velocity profile of the depths covered by the detectors is also generated from the signals. The bandwidth of the frequency spectra and the velocity profile are used to determine a depth for planting the detectors that is closer to the earth's surface than the depths previously considered.

18 Claims, 7 Drawing Sheets

SURFACE GEOPHONES

5 FT. DEEP GEOPHONES

METHOD FOR HIGH-RESOLUTION SEISMIC RECORDING USING DETECTORS PLANTED AT SHALLOW DEPTHS

FIELD OF THE INVENTION

This invention pertains to a method of acquiring high-resolution seismic data.

BACKGROUND OF THE INVENTION

Seismic surveys are conducted for the purpose of mapping subsurface geologic structures. The ability to image and map small subsurface structures depends on the bandwidth (the range of frequencies at which the amplitude of the signal exceeds that of the noise) of the signals recorded. Typical values of the bandwidth are 10 Hz to 60 Hz for a conventional seismic survey.

In seismic recording, the smallest vertical distance between two features of a structure that can be resolved is considered to be in the range of one half to one quarter of a wavelength. Therefore, to image smaller features, the signal bandwidth needs to be expanded to include smaller wavelengths or a larger band of frequencies. Consequently, seismic surveys with the goals of recording high-resolution data should be designed to increase the frequency of the signal as much as possible.

Although higher frequencies increase the ability to resolve smaller features, recording these frequencies present several problems. During the acquisition of high-resolution data, the high-frequency signals can be degraded by seismic equipment such as receiver instruments, recording arrays, and sources. Conditions at or near the surface, such as ambient noise, surface waves, and air waves can also interfere with the signals. In addition, high-frequency seismic recording is inherently limited by attenuation of the seismic waves as they travel through the earth. The high-frequency components suffer more loss of amplitude than the low-frequencies and therefore, they may not be distinguishable over ambient or surface noise.

As mentioned, the recording of high-frequency seismic signals is inherently limited by attenuation of the seismic waves as they travel through the earth. The amplitude (A) of a seismic wave of frequency f that propagates a distance z is given by $$A = A_0 e^{-z/L}$$

where $A_0$ is the initial amplitude of the seismic wave and where the attenuation length L (the distance in which the amplitude decreases to approximately one third of its original value) is given by $$L = \frac{Qv}{\pi f}.$$

The attenuation length L is useful in evaluating the effects of attenuation. The parameters of L, in addition to the frequency, are the velocity of the seismic wave v in the earth and the attenuation quality factor for the earth Q (ratio of the power stored in a material to the power dissipated). The parameters va nd Q depend on the properties of the earth. Lower values of v or lower values of Q correspond to shorter attenuation lengths and quicker reduction of the high-frequency components of the seismic signals. By the time the seismic wave propagates a distance of several attentuation lengths (L), its amplitude will be greatly reduced and may fall below the noise level. This can result in the loss of the ability to detect and record smaller features.

At depths of exploration interest (generally 1,000 to 20,000 feet), values of v range from 8,000 to 20,000 feet/second and values of Q range from 50 to 300. Table 1 shows a calculation for the wavelengths λ and attenuation lengths L for a number of different frequencies. Table 1 shows that the lower frequencies can be used to image large targets which are quite deep; however, use of the higher frequencies to image smaller targets is depth-limited. The signals at 80 Hz, that can be used to image targets with thickness of (λ/4) or 30 feet, are reduced to ⅓ of their original value by the time they travel 4,000 feet in the earth.

TABLE 1

WAVE LENGTHS AND ATTENUATION LENGTHS AT DEPTH
v = 10,000 feet/second
Q = 100

| f (Hz) | λ (ft) | L (ft) |
|---|---|---|
| 10 | 1000 | 32000 |
| 20 | 500 | 16000 |
| 40 | 250 | 8000 |
| 80 | 125 | 4000 |
| 100 | 100 | 3200 |

Seismic wave propagation through the unconsolidated soil between the surface and water table (which typically ranges from 0 feet to between 10 to 2,000 feet below the surface) can also attenuate the higher frequencies. This region is often called the weathered layer and varies widely from site to site. The weathered layer is known to have lower velocities and quality factors than deeper, more consolidated sediments. As stated earlier, lower values of v and lower values of Q correspond to shorter attenuation lengths and quicker reduction of the high-frequency components of the seismic signals.

Compressional wave velocities of the weathered layer are typically 1500–3500 feet/second. Only a few measurements of Q have been quoted in the literature and these range from 10–30. Attenuation lengths for the weathered layer are given in Table 2, and it can be seen that seismic wave propagation through the weathered layer reduces the amplitudes of the higher frequencies. For example, the amplitude of an 80 Hz signal is reduced to one-third of its original value after traveling through 160 feet of the weathered layer. The results in Table 2 show that planting sources and receivers 100 to 200 feet below the earth's surface or below the weathered layer can result in less attenuation. On the other hand, it is conventionally believed that planting sources or receivers a shallow distance below the surface would not be expected to have a large effect on the signal because this distance is a small fraction of the attenuation length. In addition, it is well known that the changes in the amplitude and phase of the seismic signal are small for distances that are small compared to a wavelength.

TABLE 2

WAVELENGTHS AND ATTENUATION LENGTHS FOR THE WEATHERED LAYER
v = 2,000 feet/second
Q = 20

| f (Hz) | λ (ft) | L (ft) |
|---|---|---|
| 10 | 200 | 1300 |
| 20 | 100 | 600 |
| 40 | 50 | 300 |

TABLE 2-continued

WAVELENGTHS AND ATTENUATION LENGTHS
FOR THE WEATHERED LAYER
v = 2,000 feet/second
Q = 20

| f (Hz) | λ (ft) | L (ft) |
|--------|--------|--------|
| 80     | 25     | 160    |
| 100    | 20     | 130    |

To increase the bandwidth of the signal, it is common to reduce the distance that the seismic wave travels in the weathered layer by planting explosive sources in shot holes drilled below the weathered layer or 100 to 200 feet below the ground surface. However, the acoustic detectors or geophones are typically disposed at or just below the surface (e.g. 0 to 0.5 feet) and are coupled to the surface by short spikes attached to the housing of the geophone. Similar methods are used for both conventional and high-resolution recording as described by Knapp and Steeples (Geophysics Vol. 51, 1986, p. 283–294).

In rare surveys, geophones have been placed 10 to 100 feet or more below the surface of the earth in order to couple the geophones to more competent material below the weathered layer. For example, Pullin, Mathews, and Hirshe (Geophysics: The Leading Edge of Exploration, Vol. 6, No. 12, 1987, P. 10–15) report on the planting of geophones 30 feet below a very absorbing Muskeg surface layer in Alberta, Canada. In addition, geophones have been planted in deep boreholes or drillholes in the soil layer as in the patent to Hawkins (U.S. Pat. No. 4,298,967). However, such surveys are expensive and time consuming because of the cost and effort in drilling a large number of deep holes and deploying geophones at these great depths. In addition, the geophones are rarely recoverable unless the holes are cased to prevent caving in of the holes.

Another factor that limits the bandwidth of seismic signals is the presence of noise. Noise is generally of two types: source generated noise and ambient noise. The largest type of source generated noise is low-frequency, horizontally propagating surface waves. These surface waves can be suppressed by the use of arrays. A receiver array typically consists of 6–12 geophones arranged at spaced intervals over 50 to 200 feet, and the signals from the individual geophones in the array are summed. The design of the optimum array lengths as well as other recording parameters is based on the results of a noise test conducted at the site prior to the seismic survey. However, arrays cannot be used when geophones are deeply buried because of the expense of drilling 6–12 holes per station.

Ambient noise generally has a broad frequency range. The high-frequency ambient noise interferes with high-frequency recording. It consists of noise from the surroundings. Sources of ambient noise include wind, traffic, livestock, machinery, etc. Deeply buried geophones can be used to shield the receivers from the ambient noise because the attenuating weathered layer will also attenuate noise propagating from the surface to the buried geophone.

There remains a need to increase the seismic bandwidth in high-resolution seismic surveys while avoiding the difficulties of deeply planted geophones.

SUMMARY OF THE INVENTION

In one embodiment, the present invention provides an improved method of obtaining high-resolution seismic data by determining the optimum geophone burial depths that gives the required bandwidth needed for the desired resolution of the target. The geophones are buried at those optimum depths to perform high-resolution seismic surveys. In another embodiment of the present invention, velocity and Q profiles of the top few feet of soil can be generated to determined whether or not the seismic wave propagation through the top few feet of soil (the shallow near surface) is substantially degraded compared to the propagation in the remaining part of the weathered layer.

During the method of this embodiment of the invention, each received signal is processed to determine the range of frequencies that can pass through the soil at various depths. The signal is digitized at a high sample rate (in the range of 2 msec) and a frequency spectrum for the digitized signal is calculated using known mathematical methods (such as the Fourier Transform). The sample interval for digitization is short enough (approximately 2 msec.) to accurately calculate the range of frequencies in the signal.

For the velocity profile, arrival times of the signals at the geophones are recorded. From these arrival times and known distances between the source of geophones, a velocity profile of the shallow near surface can be generated. This profile was not generated in past methods. Conventional seismic surveys have not used high sample rates (short sample intervals less than 2 msec). This profile will show for the various depths from the surface the velocities seismic waves will travel at those depths. From this information, the change in attenuation lengths for those depths can be inferred. In addition, measurements of Q can be made by techniques known in the art (such as spectral amplitude decay, or pulse broadening), and actual attenuation lengths for these depths calculated.

The optimum depth to place the geophones can depend solely on the bandwidth of the signal desired for a particular seismic survey or the bandwidth and the soil velocity and Q values at the survey site.

Use of the present invention provides improved high-resolution seismic data with reduced signal degradation, yet with shallowly buried geophones. With tis method, the additional cost of deeply burying geophones is avoided.

DETAILED DESCRIPTION OF THE PREFERRED EMBODIMENTS

Recent detailed experiments with high frequencies in the 560 Hz to 150 Hz range at different sites show that the shallow near surface has a surprisingly large effect on the seismic signal's bandwidth. Within a few feet of the shallow near surface, the compressional wave velocities were found to drop as low as 100 feet per second. The velocities increased rapidly with depth from the surface as the compaction of the solid increased. In addition, the Q values were found to be a low as 0.3. Thus, experiments show that attenuation lengths for high frequencies can be as short as a few feet as shown in Table 3 compared to the hundreds of feet previously thought.

TABLE 3

WAVELENGTHS AND ATTENUATION LENGTHS FOR THE SHALLOW NEAR SURFACE
v = 500 feet/second
Q = 1

| f (Hz) | λ (ft) | L (ft) |
|---|---|---|
| 10 | 50 | 16 |
| 20 | 25 | 8 |
| 40 | 13 | 4 |
| 80 | 6 | 2 |
| 100 | 5 | 1.6 |

The short attenuation lengths for the shallow near surface imply that the amplitudes of high-frequency seismic signals can be increased by planting geophones just beneath the to few feet of soil. Thus, instead of burying geophones a 100 feet below the ground surface or below the weathered layer, improvements in bandwidth can be achieved by burying geophones a few feet below the surface.

It is expected that good results will be obtained with geophones generally buried at a depth of 1-20 feet, usually at a depth of 1.5 to 10 feet. In another embodiment, buried geophones as herein above described are used to detect signals in the 50 Hz to 150 Hz range to obtain higher resolution seismic data.

One embodiment of the present invention provides a method of obtaining high-resolution seismic data by determining the optimum near surface depths at which the bandwidth of the data is substantially increased compared to the bandwidth of the data recorded at the surface. Thereafter, geophones buried at those optimum depths can be used to perform high-resolution seismic surveys.

Figure 1:
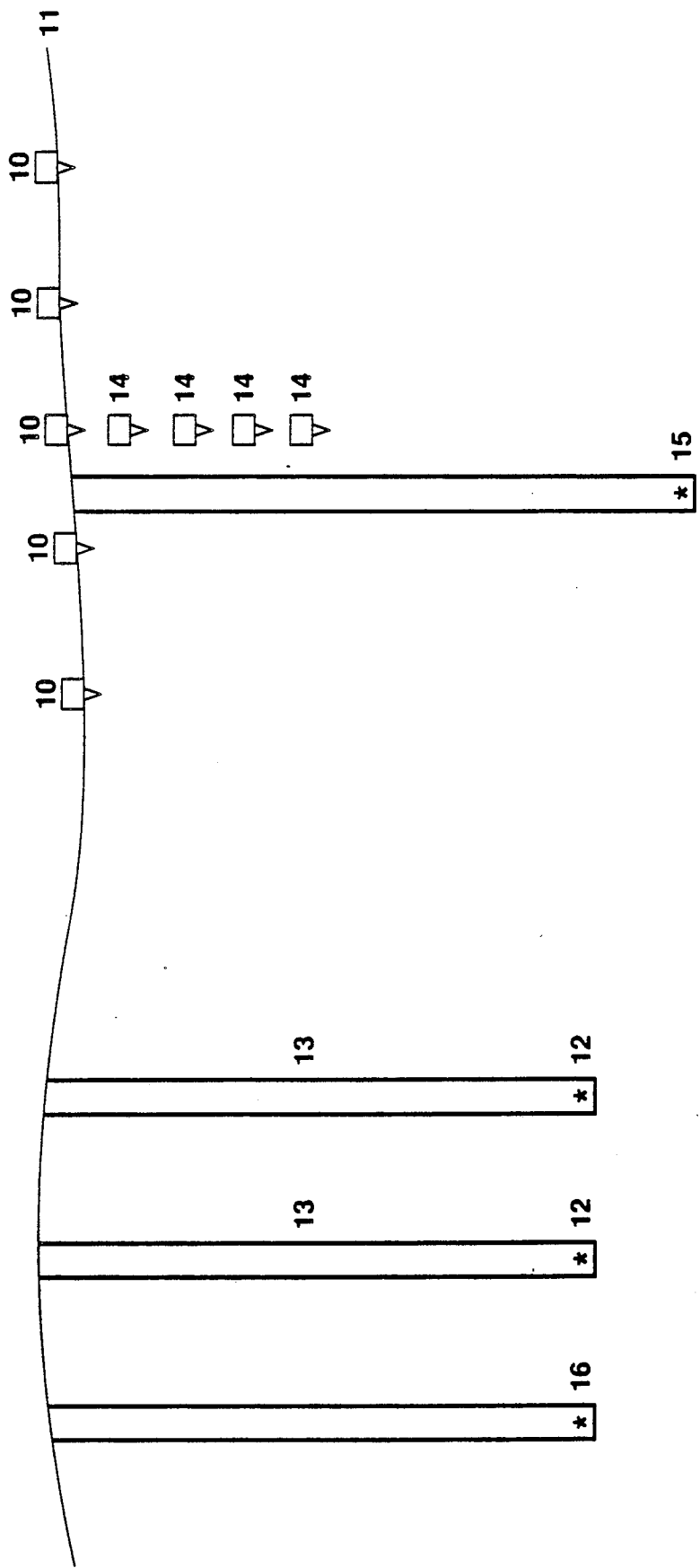
FIG. 1 is a schematic layout for a seismic noise test in the preferred embodiment of the invention.

In accordance with one embodiment of the present invention, first referring to FIG. 1, a series of conventional seismic geophones 10 are positioned individually at the ground surface 11 to perform a conventional noise test. A number of sourcing points 12 are located various distances away from the geophones. These sourcing points are shown to be dynamite charges positioned in shotholes 13 having a depth of 100 feet. Alternately, the sourcing points can be at the surface for use of surface sources. Signals generated by the source and recorded by geophones 10 can be used as in the traditional manner to analyze coherent noise and ambient noises and to design arrays or other field techniques.

In FIG. 1, geophones 14 are also planted at several shallow depths (e.g. 2 feet, 3 feet, 4 feet, etc.) from the surface. These geophones may be planted in the same hole or in separate holes at approximately the same distance from the sourcing position. For the most accurate measure of near surface velocities, a downhole sourcing position 15 located below the geophones may be used.

Signals received at the geophones are digitized and recorded using high-resolution seismic recording instruments (such as the EG&G Geometrics, Model 20420 recording system) which allow simultaneous recording of a number of geophones at high sample rates. Generally, sample times are in the range of 0.1 to 2 msec., using current technology. Preferably, sample times of less than 2 msec. are employed. Tests performed with the preferred embodiment sampled signals at approximately 0.25 msec.

Figure 2A:
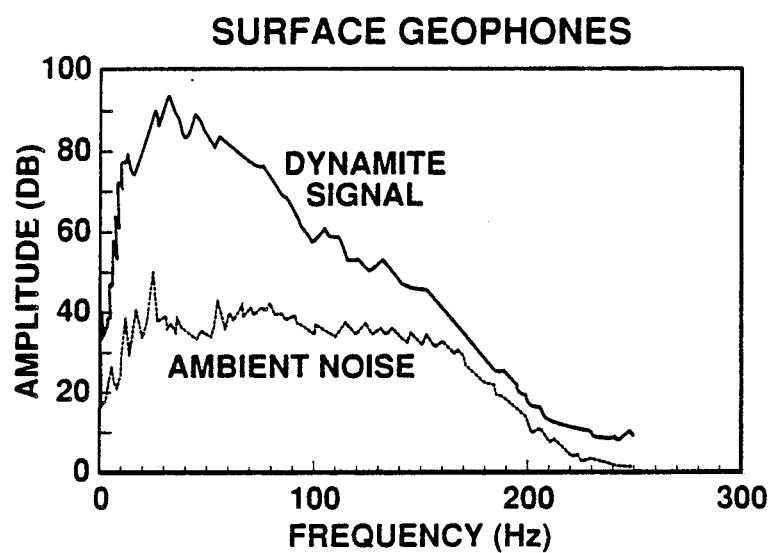
FIG. 2a is a display of frequency spectra for noise records and for signal records at the surface.
Figure 2B:
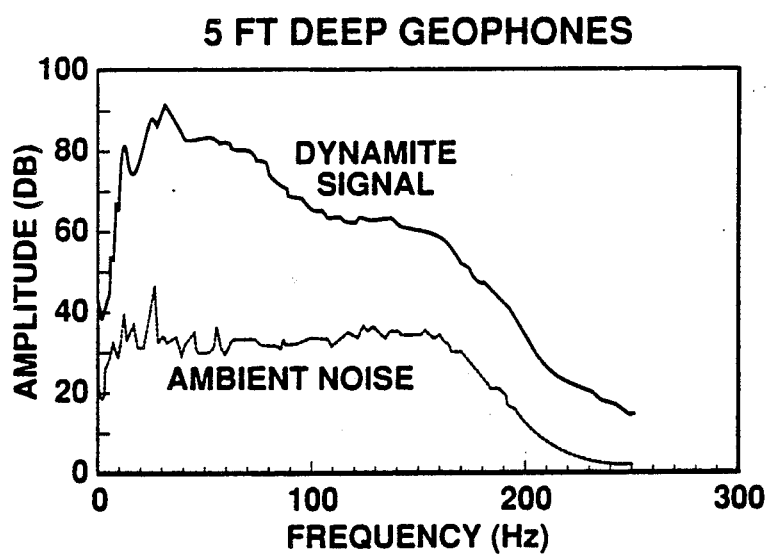
FIG. 2b is a display of frequency spectra for noise records and for signal records planted five feet below the earth's surface.

Frequency spectra for the signals recorded by geophones 14 using sourcing events 15 or 16 are computed. In addition, it is useful to record noise records using geophones 12 and no source. FIGS. 2a and 2b show frequency spectra for noise records and for signal plus noise records. As shown in FIG. 2b, the decrease in signal amplitude at high frequencies is considerably less for geophones buried at 5 feet than for geophones at the surface. These results were confirmed by wave-equation modeling using the measured velocity and attenuation values. These results are different from conventional beliefs. In addition, because the buried geophones are shielded from ambient noises such as wind by the highly attenuating near surface, the ambient noise level is reduced for the buried geophones.

The combination of an increase in the amplitude of the higher frequency signals and a decrease in ambient noise levels results in greater bandwidth for the buried geophones. Spectra from several geophones at different depths can be compared to select the optimum geophone depth for the seismic survey. Generally, the most dramatic increase in bandwidth occurs in the top three feet of soil with smaller increases with deeper burial.

Figure 3:
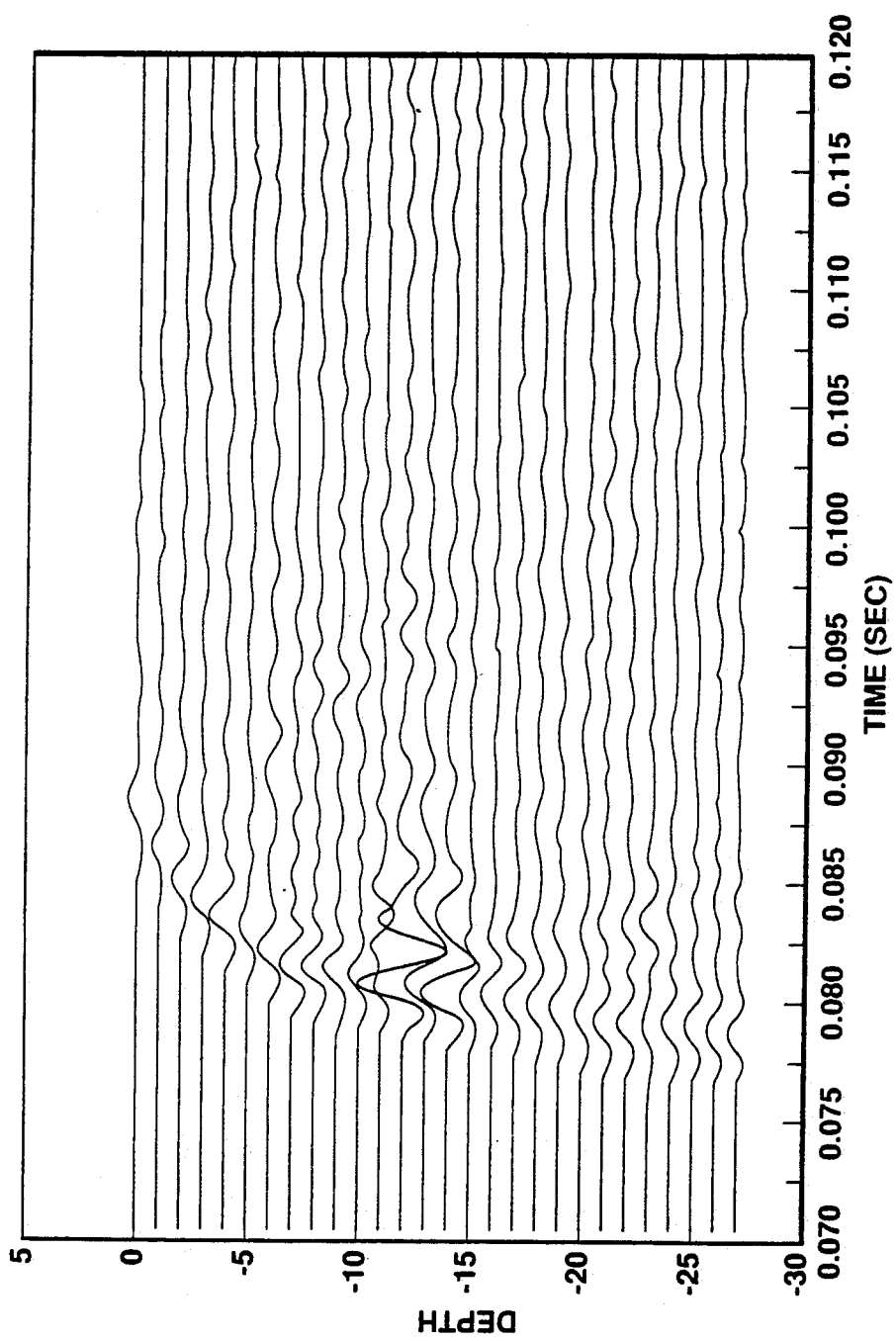
FIG. 3 represents data recorded from geophones planted vertically at several depths from the surface.
Figure 4:
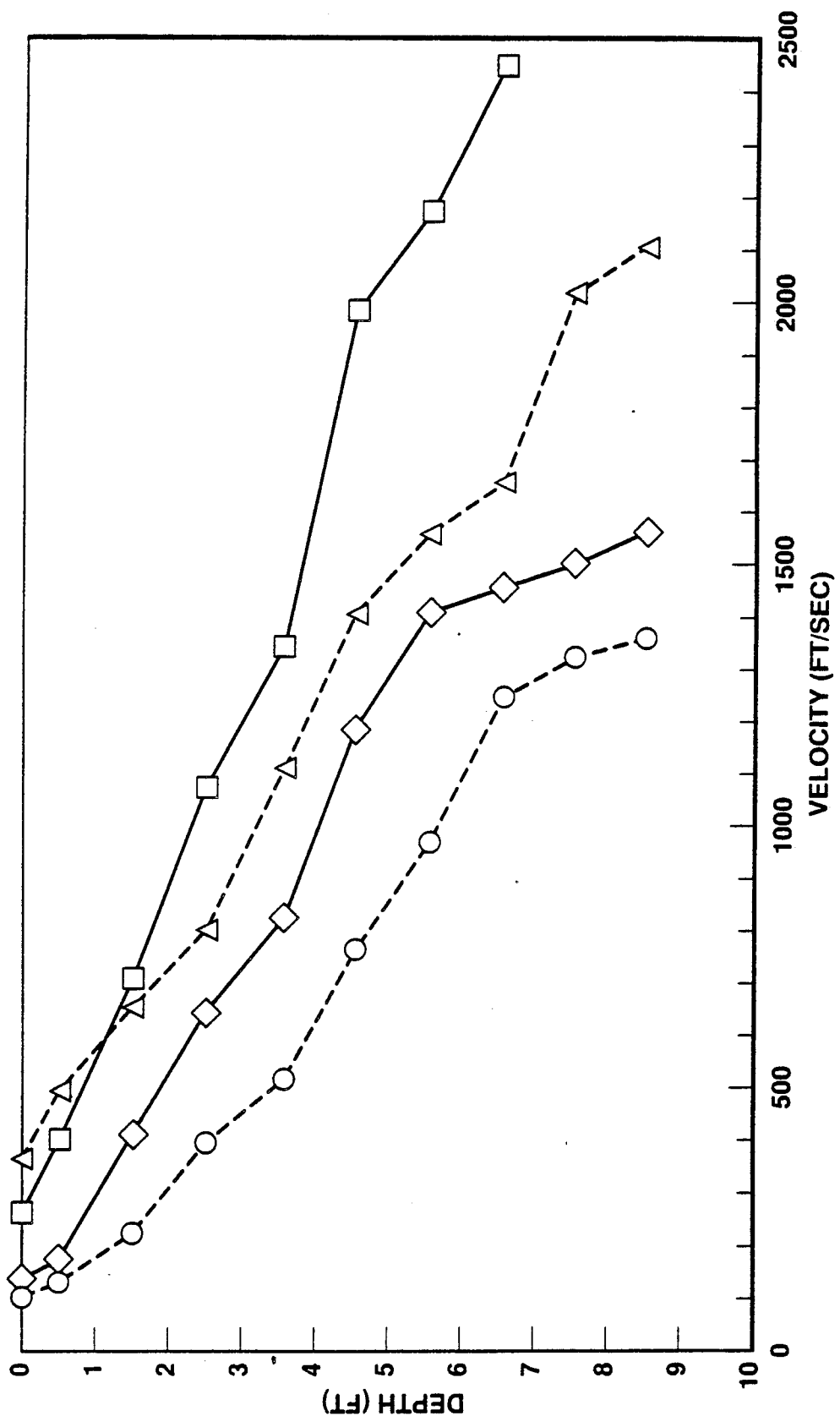
FIG. 4 graphically represents velocities determined from data recorded from the geophones planted vertically at several depths from the surface.

An example of data recorded from geophones 14 is shown in FIG. 3. The time traces for each geophone is positioned vertically by the depth of that geophone. As can be seen, the signal arrives first at the deepest geophone and appears later on the shallower phones. As the geophones approach the surface, the signal is increasingly delayed, signifying a slower velocity in the last few feet. From these time intervals, the interval velocities are determined. These steps are repeated for any depth between two geophones. For example, in FIG. 1 these steps are done for the soil between the first and second geophones between the second and third geophones, and so on. In addition, the pulse broadens signifying greater attenuating in the last few feet. Interval velocities can be computed from the data in FIG. 3 as displayed in FIG. 4. FIG. 4 includes measurements from four different sites. Lower velocities at the surface which increase rapidly with depth, indicate that burying the geophones in shallow holes can improve the bandwidth at the site.

Actual attenuation length calculations can be performed if both Q and velocity are measured. Measurements of Q can be performed on the signals recorded by geophones 14 in FIG. 1 by techniques known by the art. These techniques include measuring the pulse broadening on time sections or measuring the spectral ratios using frequency spectra. The attenuation lengths can be used to confirm that burying the geophones in shallow holes can improve the bandwidth at the site.

Figure 5:
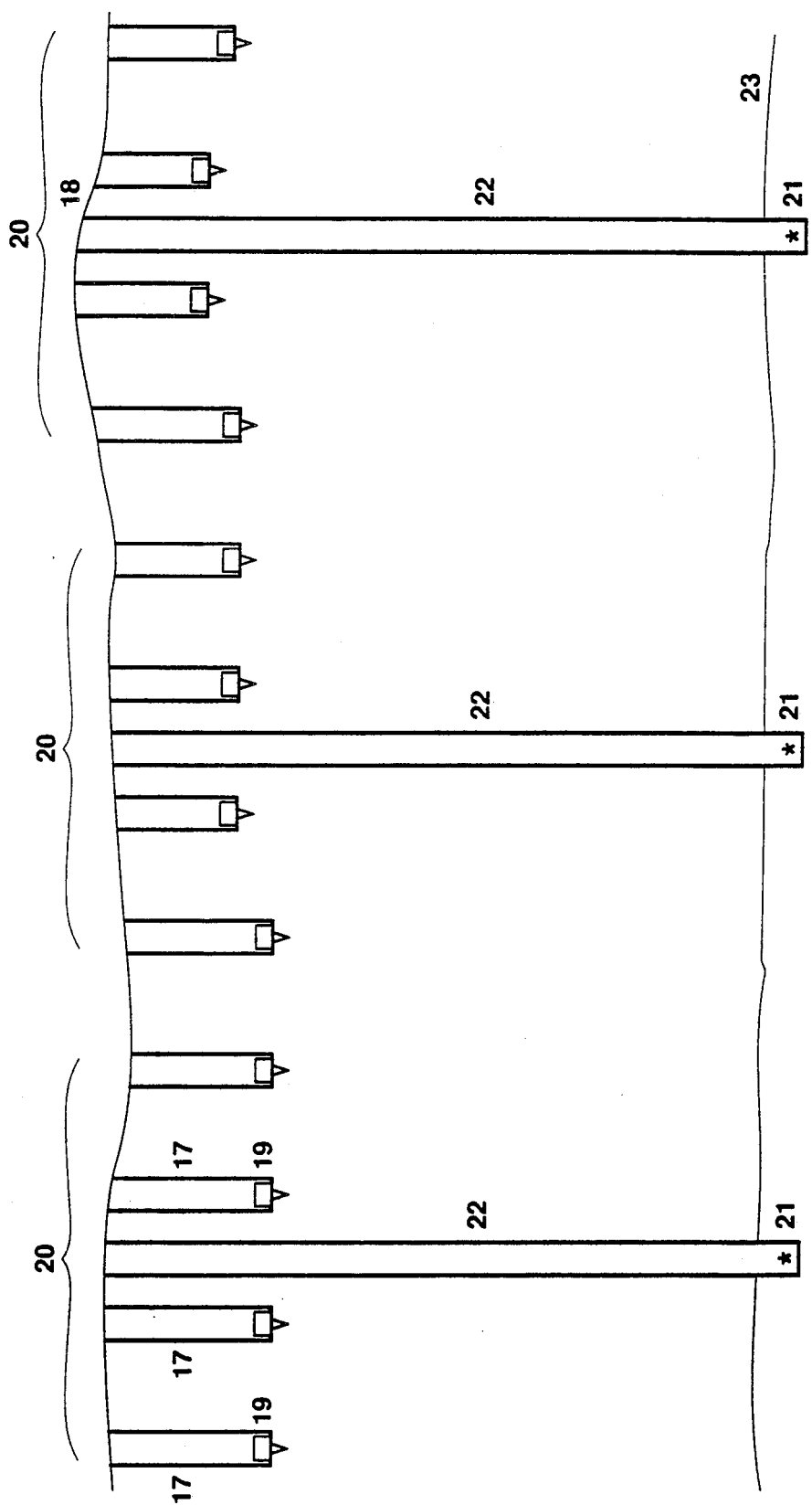
FIG. 5 is a schematic layout of a seismic survey for the preferred embodiment of the invention.

FIG. 5 is a layout of a seismic survey using an optimum depth determined from the previous test. Shallow holes 17 are dug or drilled along the seismic lines to a predetermined depth from the surface 18. If the geophones are to be recovered at the end of the experiment, it may be necessary at some sites to line the holes in order to keep them from collapsing. Geophones 19 are placed in shallow holes. If the holes are more than a foot deep, a planting pole may be used. In the preferred method, the tops of the holes are covered to increase safety. Alternatively, they may be left open or filled with soil. Signals from a group of geophones or an array 20 are combined into a single, recording channel in order to suppress horizontally propagating noise. Dynamite charges 21 are located in shotholes 22 below the weathering layer 23. Alternatively, shallowly planted dynamite or conventional surface sources may be used.

Figure 6:
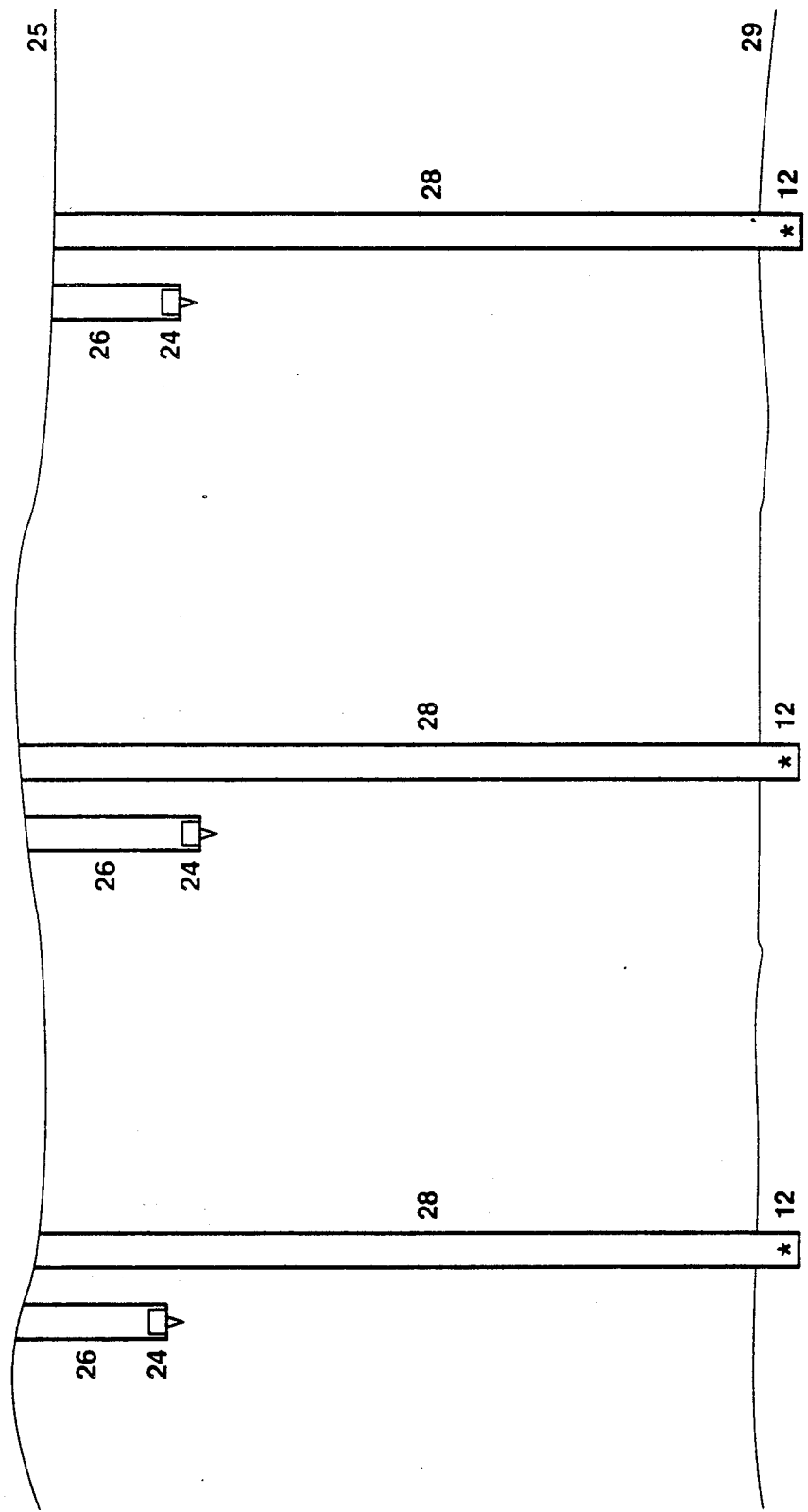
FIG. 6 is a schematic layout of a seismic survey for an alternate embodiment of the invention.

FIG. 6 is a layout of a seismic survey according to an embodiment of the invention. Geophones 24 are placed below the surface 25 in shallow holes 26. The signal detected by a geophone in each separate hole is recorded in a single, recording channel. Dynamite charges 27 are located in shotholes 28 below the weathering layer 29. Alternatively, shallowly planted dynamite or conventional surface sources may be used. This method is less expensive than the preferred embodiment because of the smaller number of holes required. The noise test is used to determine whether the additional expense of burying arrays of geophones instead of single geophones is warranted.

In experiments illustrated by FIG. 6, seismic surveys were performed at different sites. In particular, comparison were made between surface and buried geophones by planting both types of geophones along a seismic line and recording one source pass through the line. The sources were small dynamite charges buried below the water table. The gathered data were analyzed for coherent energy content as a function of frequency. In addition, stacked data sets with identical processing were compared for the buried and surface geophones, respectively.

Figure 7A:
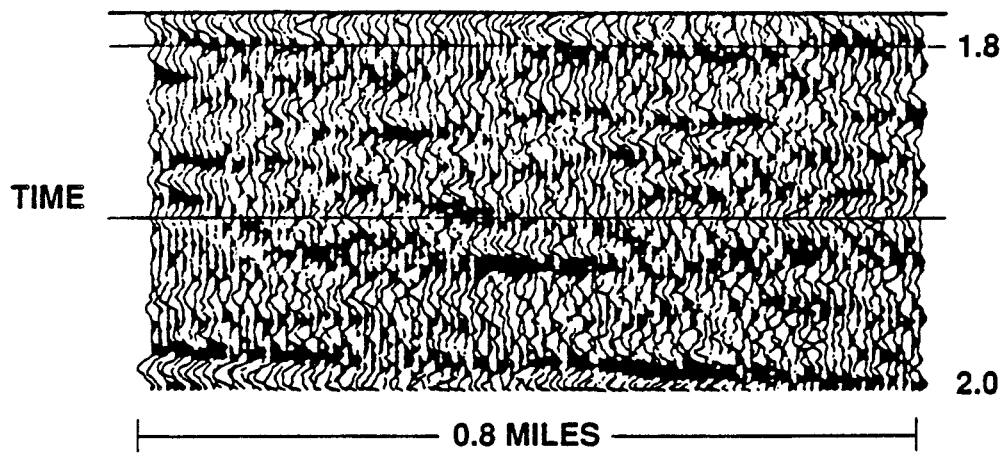
FIG. 7a is a segment of a seismic line for geophones at the surface.
Figure 7B:
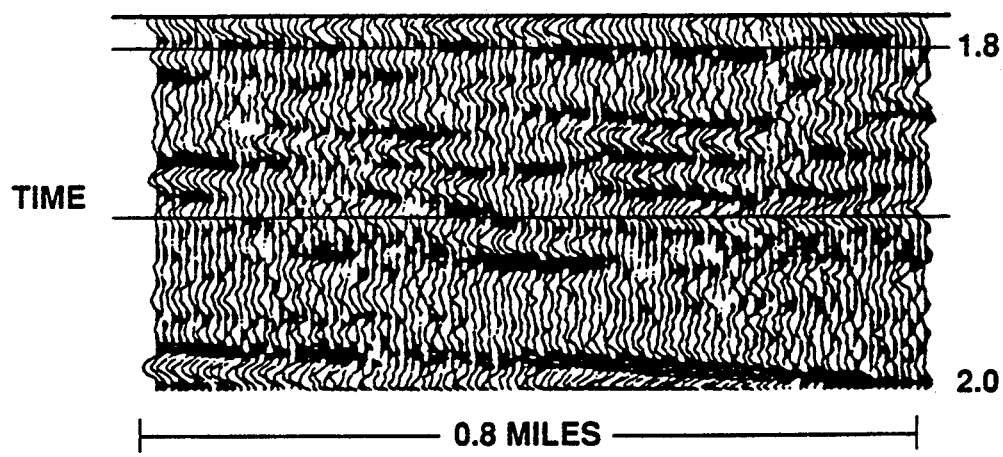
FIG. 7b is a segment of a seismic line for geophones planted five feet below the earth's surface.

FIGS. 7a and 7b show a portion of the seismic line comparing surface and buried geophones. The seismic line was processed identically for the two sections. Elevation and reflection statics were applied. Source and receiver gather deconvolutions were applied to provide the same prestack pulse shape. Stacking velocities were derived from the surface geophone data. After the stack, a shaping deconvolution was applied to produce the same pulse for each section. The improved bandwith and signal-to-noise ratio of the buried geophone line allows a more detailed interpretation of the seismic section than could be made for the surface geophone lines. Similar results were obtained at the other three sites.

The method of this invention provides significant advantages over the current methods. The method of this invention has been described in connection with its preferred embodiments. However, it is not limited thereto. Changes and modifications to the basic design will be obvious to those skilled in the art having the benefit of the foregoing teachings. All such changes and modifications are intended to be within the scope of the invention which is limited only by the following claims.

What is claimed is:

1. A method of high-resolution seismic recording using planted detectors comprising the steps of:
   (a) planting at least two detectors spaced vertically apart from each other below the earth's surface;
   (b) receiving a signal at each detector, each signal resulting from the operation of a seismic source;
   (c) digitizing the received signals at a sampling interval that is adequate to accurately calculate the range of frequencies in said received signals;
   (d) measuring the frequency spectra for each signal received by said detectors;
   (e) determining from the frequency spectra an appropriate depth from the surface to plant the detectors to record high-frequency signals without shallow-near-surface attenuation and with reduced surface ambient noise;
   (f) planting detectors at or about said appropriate depth below the earth's surface; and
   (g) receiving high-resolution signals at each detector placed below the earth's surface in step (f).

2. The method of claim 1, wherein said sampling interval in step (c) is shorter than or equal to 2 msec.

3. The method of claim 1, wherein one detector is spaced approximately one foot from another said detector.

4. The method of claim 1, wherein detectors in step (f) can be groups or arrays of detectors.

5. The method of claim 4, wherein signals received at a group or array of detectors are stacked to improve the signal-to-noise ratio.

6. A method of high-resolution seismic recording using planted subsurface detectors comprising the steps of:
   (a) receiving a seismic signal at each of a pair of planted surface detectors, each signal resulting from the operation of a seismic source, said planted subsurface detectors being spaced a vertical interval apart;
   (b) digitizing the received signals at a sampling interval that is adequate to determine a time interval between arrivals of said signals at said detectors and adequate to measure a frequency spectra of each detected signal;
   (c) measuring the frequency spectra for each signal received by said detectors;
   (d) determining from the time interval between arrivals at the detectors a velocity at which signals travel over the depth interval between where the detectors are planted;
   (e) repeating steps (a) through (d) for detectors spaced over different intervals;
   (f) generating a velocity profile of the earth's formation;
   (g) determining from the velocity profile and frequency spectra an appropriate depth from the surface to plant detectors to record high-frequency signals without shallow-near-surface attenuation and with a reduced surface ambient noise;
   (h) planting detectors at said appropriate depth below the earth's surface; and
   (i) receiving high-resolution signals at each detector placed below the earth's surface in step (h).

7. The method of claim 6, wherein said sample interval in step (b) is shorter than or equal to 2 msec.

8. The method of claim 6, wherein one detector is spaced approximately one foot from another said detector.

9. The method of claim 6, wherein detectors in step (h) can be groups or arrays of detectors.

10. The method of claim 6, wherein signals received at a said group or array of detectors are stacked to improve the signal-to-noise ratio.

11. A method for determining an optimum depth to plant detectors when performing seismic recording of signals having frequencies of at least 50 HZ comprising the steps of:
(a) planting a plurality of detectors spaced vertically apart from each other below the earth's surface;
(b) determining a sample interval adequate to detect a time interval between arrivals of signals at said detectors and adequate to measure a frequency spectra for a detected signal;
(c) receiving signals at each detector, each signal resulting from the operation of a seismic source;
(d) digitizing the received signals at said sample interval determined in step (b);
(e) measuring the frequency spectra for each signal received by said detectors;
(f) determining time intervals between arrivals of said signals;
(g) determining from the time interval between a group of at least two arrivals a velocity that seismic waves travel at a depth between detectors of said arrivals;
(h) repeating steps (f) and (g) for a different pair of arrivals to generate a velocity profile of the near surface
(i) determining an optimum depth from the velocity profile and frequency spectra.

12. The method of claim 11, wherein said sample interval in step (c) is shorter than or equal to 2 msec.

13. The method of claim 11, wherein one detector is spaced approximately one foot from another said detector.

14. The method of claim 11, wherein detectors in step (f) can be groups or arrays of detectors.

15. The method of claim 14, wherein signals received at a said group or array of detectors are stacked to improve the signal-to-noise ratio.

16. A method for determining an optimum depth to plant detectors when performing seismic recording of signals having frequencies of at least 50 HZ comprising the steps of:
(a) planting a plurality of detectors spaced vertically apart from each other below the earth's surface;
(b) determining a sample interval adequate to detect a time interval between arrivals of signals at said detectors and adequate to measure a frequency spectra for a detected signal;
(c) receiving signals at each detector, each signal resulting from the operation of a seismic source;
(d) digitizing the received signals at said sample interval determined in step (b);
(e) measuring the frequency spectra for each signal received by said detectors;
(f) determining time intervals between arrivals of said signals;
(g) determining from the time interval between a group of at least two arrivals a velocity that seismic waves travel at a depth between detectors of said arrivals;
(h) repeating steps (f) and (g) for a different pair of arrivals to generate a velocity profile of the near surface;
(i) determining an optimum depth from the velocity profile and frequency spectra; and
(j) planting detectors at said depth below the earth's surface.

17. The method of claim 16, wherein said detectors are planted at different depths in one hole.

18. The method of claim 16, wherein said detectors are planted at different depths in separate holes, each hole an equal distance from a source.

* * * * *